(12) United States Patent
Bertagnolli et al.

(10) Patent No.: US 8,602,132 B2
(45) Date of Patent: *Dec. 10, 2013

(54) SUPERABRASIVE MATERIALS AND METHODS OF MANUFACTURE

(71) Applicant: US Synthetic Corporation, Orem, UT (US)

(72) Inventors: Kenneth E. Bertagnolli, Sandy, UT (US); Craig H. Cooley, Saratoga Springs, UT (US); Jason Wiggins, Draper, UT (US)

(73) Assignee: US Synthetic Corporation, Orem, UT (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/659,703

(22) Filed: Oct. 24, 2012

(65) Prior Publication Data

US 2013/0048390 A1    Feb. 28, 2013

Related U.S. Application Data

(63) Continuation of application No. 11/424,674, filed on Jun. 16, 2006, now Pat. No. 8,316,969.

(51) Int. Cl.
*E21B 10/36* (2006.01)
*E21B 10/46* (2006.01)

(52) U.S. Cl.
USPC ......... 175/434; 175/420.2; 175/426; 175/428

(58) Field of Classification Search
USPC ............... 175/347, 420.2, 426, 428, 434, 374
See application file for complete search history.

(56) References Cited

U.S. PATENT DOCUMENTS

| 3,316,073 A | 4/1967 | Kelso |
| 3,667,911 A | 6/1972 | Balchan et al. |

(Continued)

FOREIGN PATENT DOCUMENTS

| EP | 0 012 631 | 6/1980 |
| EP | 0 052 922 | 6/1982 |

(Continued)

OTHER PUBLICATIONS

Donev A. Cisse I. Sachs D. Variano E.A. Stillinger F.H. Connely R. Torquato S. and Chaikin P.M. (2004). Improving the density of jammed disordered packings using ellipsoids. Science 303(5660) 990-993.

(Continued)

*Primary Examiner* — Brad Harcourt
(74) *Attorney, Agent, or Firm* — Holland & Hart LLP

(57) ABSTRACT

Methods of manufacturing sintered superabrasive structures are disclosed. For example, a plurality of agglomerated granules comprising at least one superabrasive material may be provided and exposed to a pressure and a temperature sufficient to sinter the at least one superabrasive material. In another example, a plurality of agglomerated granules comprising diamond may be provided and exposed to a pressure and a temperature sufficient to form polycrystalline diamond. Articles of manufacture including at least one superabrasive material are disclosed. For example, a polycrystalline diamond compact may comprise a volume of polycrystalline diamond bonded to a substrate, wherein the volume of polycrystalline diamond includes a plurality of agglomerated granules which have been sintered. A drill bit comprising at least one cutting element including a volume of polycrystalline diamond bonded to a substrate wherein the volume of polycrystalline diamond includes a plurality of agglomerated granules which have been sintered is disclosed.

10 Claims, 11 Drawing Sheets

(56) References Cited

U.S. PATENT DOCUMENTS

| | | |
|---|---|---|
| 3,667,991 A | 6/1972 | Miller |
| 3,745,623 A | 7/1973 | Rocco et al. |
| 3,879,901 A | 4/1975 | Caveney |
| 4,268,276 A | 5/1981 | Bovenkerk |
| 4,274,900 A | 6/1981 | Mueller et al. |
| 4,389,223 A | 6/1983 | Corrigan |
| 4,403,015 A | 9/1983 | Nakai et al. |
| 4,410,054 A | 10/1983 | Nagel et al. |
| 4,455,354 A | 6/1984 | Dillon et al. |
| 4,468,138 A | 8/1984 | Nagel |
| 4,476,656 A | 10/1984 | Bovenkerk |
| 4,526,734 A | 7/1985 | Enomoto |
| 4,560,014 A | 12/1985 | Geczy |
| 4,664,705 A | 5/1987 | Horton et al. |
| 4,738,322 A | 4/1988 | Hall et al. |
| 4,811,801 A | 3/1989 | Salesky et al. |
| 4,884,477 A | 12/1989 | Smith et al. |
| 4,913,247 A | 4/1990 | Jones |
| 5,011,514 A | 4/1991 | Cho et al. |
| 5,016,718 A | 5/1991 | Tandberg |
| 5,030,276 A | 7/1991 | Sung et al. |
| 5,092,687 A | 3/1992 | Hall |
| 5,120,327 A | 6/1992 | Dennis et al. |
| 5,135,061 A | 8/1992 | Newton |
| 5,151,107 A | 9/1992 | Cho et al. |
| 5,154,245 A | 10/1992 | Waldenstrom et al. |
| 5,364,192 A | 11/1994 | Damm et al. |
| 5,368,398 A | 11/1994 | Damm et al. |
| 5,460,233 A | 10/1995 | Meany et al. |
| 5,468,268 A | 11/1995 | Tank et al. |
| 5,480,233 A | 1/1996 | Cunningham |
| 5,505,748 A | 4/1996 | Tank et al. |
| 5,544,713 A | 8/1996 | Dennis |
| 5,855,996 A | 1/1999 | Corrigan et al. |
| 5,954,147 A | 9/1999 | Overstreet et al. |
| 5,964,100 A | 10/1999 | Wisniewski |
| 5,981,445 A | 11/1999 | Kirchnerova et al. |
| 6,063,502 A | 5/2000 | Sue et al. |
| 6,079,215 A | 6/2000 | Wisniewski |
| 6,132,675 A | 10/2000 | Corrigan et al. |
| 6,170,269 B1 | 1/2001 | Wisniewski |
| 6,454,027 B1 | 9/2002 | Fang et al. |
| 6,790,126 B2 | 9/2004 | Wood et al. |
| 6,793,681 B1 | 9/2004 | Pope et al. |
| 6,862,890 B2 | 3/2005 | Williams, III et al. |
| 6,951,578 B1 | 10/2005 | Belnap et al. |
| 7,007,406 B2 | 3/2006 | Wang |
| 7,048,081 B2 | 5/2006 | Smith et al. |
| 7,211,218 B2 | 5/2007 | Fang et al |
| 7,243,744 B2 | 7/2007 | Griffo |
| 7,441,610 B2 | 10/2008 | Belnap et al. |
| 7,516,804 B2 | 4/2009 | Vail |
| 7,806,206 B1 | 10/2010 | Miess |
| 8,151,911 B1 | 4/2012 | Miess |
| 8,316,969 B1 * | 11/2012 | Bertagnolli et al. .......... 175/434 |
| 8,448,727 B1 | 5/2013 | Miess |
| 2002/0160694 A1 | 10/2002 | Wood et al. |
| 2004/0221515 A1 | 11/2004 | McArdle et al. |
| 2005/0019114 A1 | 1/2005 | Sung |
| 2005/0051366 A1 | 3/2005 | Frushour |
| 2005/0230156 A1 | 10/2005 | Belnap et al. |
| 2005/0263328 A1 | 12/2005 | Middlemiss |
| 2005/0263388 A1 | 12/2005 | Lee et al. |
| 2006/0115408 A1 | 6/2006 | Akaishi et al. |
| 2006/0162969 A1 | 7/2006 | Belnap et al. |
| 2006/0191722 A1 | 8/2006 | Belnap et al. |
| 2007/0079992 A1 | 4/2007 | Curry et al. |
| 2007/0193782 A1 | 8/2007 | Fang et al. |
| 2008/0023230 A1 | 1/2008 | Cho |
| 2008/0247899 A1 | 10/2008 | Cho et al. |
| 2009/0152015 A1 | 6/2009 | Sani et al. |
| 2009/0307987 A1 | 12/2009 | Davies et al. |

FOREIGN PATENT DOCUMENTS

| | | |
|---|---|---|
| EP | 0 0352 811 | 7/1989 |
| EP | 0 365 843 | 5/1990 |
| WO | 0038864 | 7/2000 |
| WO | 2004040029 A1 | 5/2004 |
| WO | 2004111284 A2 | 12/2004 |
| WO | 2008114228 A1 | 9/2008 |

OTHER PUBLICATIONS

International Search Report and Written Opinion of the International Searching Authority for PCTUS2007013782 dated Nov. 19, 2007 (12 pages).

* cited by examiner

SUPERABRASIVE MATERIALS AND METHODS OF MANUFACTURE

CROSS-REFERENCE TO RELATED APPLICATIONS

This application is a continuation of, and claims priority to, U.S. patent application Ser. No. 11/424,674, filed on Jun. 16, 2006, the disclosure of which is incorporated by reference in its entirety.

BACKGROUND

Apparatuses comprising a superabrasive material are utilized for a variety of applications and in a corresponding variety of mechanical systems. For example, polycrystalline diamond elements are used in drilling tools (e.g., inserts, cutting elements, gage trimmers, etc.), machining equipment, bearing apparatuses, wire drawing machinery, and in other mechanical systems. More specifically, polycrystalline diamond compacts have found utility as cutting elements in drill bits (e.g., roller cone drill bits and fixed cutter drill bits). Generally, a superabrasive material may be formed by sintering individual superabrasive particles or grains to one another to form a coherent structure, as described in detail below relative to forming polycrystalline diamond.

In one specific example, a polycrystalline diamond compact ("PDC") typically includes a diamond layer or table formed by a sintering process employing high temperature and high pressure conditions that causes a diamond table or layer to become bonded to a substrate (such as a cemented tungsten carbide substrate), as described in greater detail below. Optionally, the substrate may be brazed or otherwise joined to an attachment member such as a stud or cylindrical backing, if desired. A PDC may be employed as a subterranean cutting element mounted to a drill bit either by press-fitting, brazing, or otherwise locking the cutting element or stud into a receptacle defined by the drill bit. In one example, cutter pockets may be formed in the face of a matrix-type bit comprising tungsten carbide particles that are infiltrated or cast with a binder (e.g., a copper-based binder), as known in the art. Thus, a rotary drill bit may include a plurality of polycrystalline cutting elements affixed to the drill bit body. Such subterranean drill bits are typically used for rock drilling and for other operations which require high abrasion resistance or wear resistance.

A PDC is normally fabricated by placing a cemented carbide substrate into a container or cartridge with a layer of diamond crystals or grains positioned adjacent one surface of a substrate. A number of such cartridges may be typically loaded into an ultra-high pressure press. The substrates and adjacent diamond crystal layers are then sintered under ultra-high temperature and ultra-high pressure conditions ("HPHT sintering"). The ultra-high pressure and ultra-high temperature conditions cause the diamond crystals or grains to bond to one another to form polycrystalline diamond. In addition, as known in the art, a catalyst may be employed for facilitating formation of polycrystalline diamond. In one example, a so-called "solvent catalyst" may be employed for facilitating the formation of polycrystalline diamond. For example, cobalt, nickel, and iron are among examples of solvent catalysts for forming polycrystalline diamond. In one configuration, during HPHT sintering, solvent catalyst within the substrate body (e.g., cobalt from a cobalt-cemented tungsten carbide substrate) becomes liquid and sweeps from the region adjacent to the diamond powder and into the diamond grains. Of course, a solvent catalyst may be mixed with the diamond powder prior to sintering, if desired. Also, as known in the art, such a solvent catalyst may dissolve carbon. Thus, carbon may be dissolved from the diamond grains or portions of the diamond grains that graphitize due to the high temperatures of HPHT sintering. The solubility of the stable diamond phase in the solvent catalyst is lower than that of the metastable graphite under HPHT sintering conditions. As a result of this solubility difference, the undersaturated graphite tends to dissolve into solution and the supersaturated diamond tends to deposit onto existing nuclei to form diamond-to-diamond bonds. Thus, diamond grains become mutually bonded to form a polycrystalline diamond table upon the substrate. Subsequent to HPHT sintering, the solvent catalyst may remain in the polycrystalline diamond layer within the interstitial pores between the diamond grains or the solvent catalyst may be at least partially removed from the polycrystalline diamond, as known in the art. For instance, the solvent catalyst may be at least partially removed from the polycrystalline diamond by acid leaching. A conventional process for forming polycrystalline diamond cutters is disclosed in U.S. Pat. No. 3,745,623 to Wentorf, Jr. et al., the disclosure of which is incorporated herein, in its entirety, by this reference. Optionally, another material may replace the solvent catalyst that has been at least partially removed from the polycrystalline diamond.

One of ordinary skill in the art may appreciate that providing superabrasive (e.g., polycrystalline diamond), superabrasive (e.g., polycrystalline diamond) compacts, apparatuses, structures, or other articles of manufacture including material with improved properties and methods of manufacture may be advantageous.

SUMMARY

One aspect of the present invention relates to a method of manufacturing a sintered superabrasive structure. Particularly, in one embodiment, a plurality of agglomerated granules comprising at least one superabrasive material may be provided. Further, the agglomerated granules may be exposed to a pressure and a temperature sufficient to sinter the at least one superabrasive material. One embodiment of the present invention relates to a method of manufacturing polycrystalline diamond. Particularly, in such an embodiment, a plurality of agglomerated granules comprising diamond may be provided. Further, the agglomerated granules may be exposed to a pressure and a temperature sufficient to form polycrystalline diamond.

An additional aspect of the present invention relates to an article of manufacture. Specifically, an article of manufacture may comprise a volume of polycrystalline diamond bonded to a substrate (e.g., a compact, a cutting element, a wire die, a heat sink, a wear element, etc.). In one embodiment, a polycrystalline diamond compact may comprise a volume of polycrystalline diamond bonded to a substrate, wherein the volume of polycrystalline diamond includes a plurality of agglomerated granules which have been sintered to form the polycrystalline diamond volume.

A further aspect of the present invention relates to a drill bit for drilling a subterranean formation. Such a drill bit may include a bit body comprising a leading end having generally radially extending blades structured to facilitate drilling of a subterranean formation. Further, the drill bit may include at least one cutting element comprising a substrate including a volume of polycrystalline diamond bonded to the substrate on an end surface of the substrate. Additionally, the volume of polycrystalline diamond may include a plurality of agglomerated granules which have been sintered to form the volume of polycrystalline diamond.

Features from any of the above-mentioned embodiments may be used in combination with one another, without limitation. In addition, other features and advantages of the instant disclosure will become apparent to those of ordinary skill in the art through consideration of the ensuing description, the accompanying drawings, and the appended claims.

BRIEF DESCRIPTION OF THE DRAWINGS

Further features of the subject matter of the instant disclosure, its nature, and various advantages will be more apparent from the following detailed description and the accompanying drawings, which illustrate various exemplary embodiments, are representations, and are not necessarily drawn to scale, wherein.

DETAILED DESCRIPTION

Figure 1:
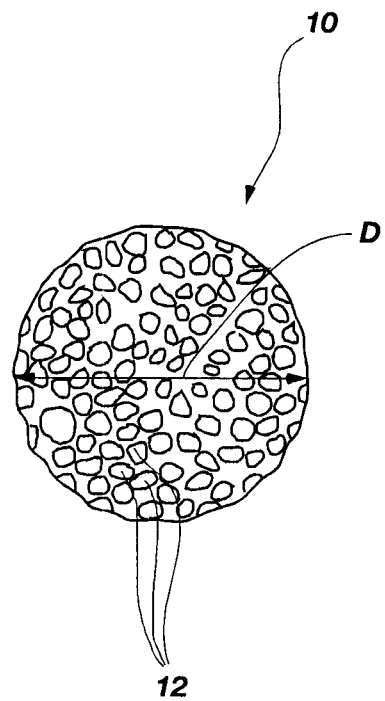
FIG. 1 shows a magnified view of an agglomerated granule according to one embodiment of the present invention.

The present invention relates generally to structures comprising superabrasive (e.g., polycrystalline diamond) materials and methods of manufacturing such structures. As used herein, "superabrasive" means any material having a hardness greater than a hardness of tungsten carbide. Relative to polycrystalline diamond, as described above, during sintering, small diamond particles or grains (i.e., diamond powder) bond to one another to form a larger, substantially coherent structure. More specifically, manufacturing polycrystalline diamond involves the compression of diamond particles under extremely high pressure. Such compression may begin at room temperature, at least initially, and may result in the reduction of void space in the diamond powder (e.g., due to brittle crushing, sliding, and/or stacking of diamond particles). Of course, diamond particles are very hard and may not crush or fracture easily. Thus, the diamond particles may sustain very high local pressures where they come in contact with each other, while the pressures experienced on noncontacting surfaces of the diamond particles and in the interstitial voids may be lower. Manufacturing polycrystalline diamond further involves heating the diamond during compression of the diamond powder. Such heating may increase the temperature of the diamond from room temperature at least to the melting point of a solvent-catalyst. At elevated temperature, regions of the diamond that are not under high local pressure may graphitize. As a solvent-catalyst melts, the solvent-catalyst may infiltrate or "sweep" through the diamond particles. In addition, as known in the art, a solvent catalyst (e.g., cobalt, nickel, iron, etc.) may dissolve and transport carbon between the diamond grains and facilitate diamond formation. Particularly, the presence of a solvent catalyst may facilitate formation of diamond-to-diamond bonds comprising polycrystalline diamond and resulting in a coherent skeleton or matrix of diamond.

Generally, the present invention contemplates, in one embodiment, that a plurality of relatively small superabrasive particles (e.g., diamond particles) may be agglomerated to form a plurality of larger (in comparison to an isolated small superabrasive particle) agglomerated granules. Further, such agglomerated granules comprising at least one superabrasive material may be used for forming a sintered superabrasive structure. Such agglomerated granules may beneficially influence bonding characteristics of a sintered superabrasive structure, which may, in turn, beneficially influence performance characteristics of the superabrasive structure.

As discussed below, in one embodiment, a plurality of superabrasive agglomerated granules may be substantially spherical. In another embodiment, a plurality of superabrasive agglomerated granules may be generally ellipsoid or generally ovoid. Any of such configurations (or combinations thereof), as discussed below, may increase packing density (i.e., reducing a percentage of void space within the diamond material) of the superabrasive material during compression (e.g., prior to HPHT sintering, during HPHT sintering, or both).

In one particular example, a diamond material may be employed for forming agglomerated granules. Put another way, a superabrasive material may comprise diamond particles (e.g., suitable for forming polycrystalline diamond) which may be agglomerated to one another to form one or more agglomerated granules. In one embodiment, the superabrasive material may comprise diamond powder having a nominal size of between about 10 μm and about 100 μm. In another embodiment, a diamond powder may have a nominal size of about 2 μm to about 20 μm. Further, in an additional embodiment, a diamond powder may exhibit a nominal size of less than about 1 μm (e.g., submicron-sized or nano-scale diamond powder). Any combination of the foregoing size ranges or other diamond powder formulations (as known in the art or otherwise developed) are encompassed by the present invention, without limitation. Diamond powder of various size and properties, which may be known as synthetic grit or diamond grit/powder, may be commercially available from, for example, Diamond Innovations of Worthington, Ohio, among other commercial manufacturers. More generally, any superabrasive material (cubic boron nitride, silicon carbide, etc.) may exhibit nominal sizes as discussed above.

In further detail, superabrasive sintering (e.g., HPHT sintering to form polycrystalline diamond) may be facilitated by small particle size because reducing surface area may enhance sintering. More specifically, prior to sintering, atoms at free surfaces of superabrasive particles have unsatisfied bonds which may become more stable when bonded to surrounding atoms. Thus, submicron-sized or nano-scale powders (less then 1 μm) may be desirable for sintering because they exhibit very large surface area for sintering. However, submicron-sized powders may produce a relatively low "green density." As discussed in further detail below, "green density" refers to a compressed density of a superabrasive material prior to sintering. Submicron-sized or nano-scale powders may also be difficult to handle. The present invention contemplates that agglomerating submicron-sized superabrasive material or powder may facilitate sintering and/or sintering-related actions (e.g., handling, etc.) with such submicron-sized superabrasive powders. For example, agglomeration (e.g., freeze-granulation) may provide submicron-sized or nano-scale powders that can be easily handled and optionally compressed to a relatively high green density prior to sintering.

In one aspect of the present invention, a method for forming agglomerated granules comprising at least one superabrasive material is contemplated. Particularly, a plurality of superabrasive particles may be provided and may be agglomerated (i.e., held together) to one another to form agglomerated granules. Generally, any process as known in the art may be utilized for forming agglomerated granules (e.g., freeze drying, spray-drying, sieve granulation, or as otherwise known in the art). For example, a so-called freeze-granulation process may be employed for forming agglomerated granules comprising at least one superabrasive material (e.g., diamond, boron nitride, silicon carbide, etc.). Generally, a freeze-granulation process may include superabrasive particles, a solvent, a dispersant, and a binder, wherein a mixture of the foregoing is injected through a nozzle and into a liquid nitrogen bath. As one of ordinary skill in the art will appreciate, the superabrasive particles may also optionally include sintering aids (e.g., catalysts or solvents for forming polycrystalline diamond) or other constituents in addition to superabrasive particles, without limitation. Such an injection process may form generally spherical agglomerated granules held together by the binder. Also, such an injection process may form agglomerated granules exhibiting a generally uniform size. Optionally, most of the binder (if not substantially all of the binder), may be removed from an agglomerated granule after forming the agglomerated granule. Such a freeze drying process may provide agglomerated granules exhibiting a controllable density, substantially no cavities within the agglomerated granules, and a relatively high degree of homogeneity. Further, freeze drying equipment and processes may produce relatively high yield and may be easy to clean. Additionally, small quantities (e.g., about 50 ml-about 100 ml) can be easily produced. Freeze drying or granulation systems may be commercially available from, for example, PowderPro AB of Sweden.

As mentioned above, the present invention contemplates, in one embodiment, that a plurality of relatively small diamond particles may be agglomerated to form a larger agglomerated granule. For example, FIG. 1 shows an agglomerated granule 10 comprising an agglomeration of diamond particles 12. As shown in FIG. 1, agglomerated granule 10 includes a plurality of diamond particles 12 held together by a binder. More particularly, FIG. 1 shows an agglomerated granule 10 comprising diamond particles 12, wherein the diamond particles 12 exhibit a nominal size of about 20 μm. As mentioned above, diamond particles 12 may exhibit a nominal size of between about 10 μm and 100 μm. In another embodiment, diamond particles 12 may exhibit a nominal size of about 2 μm to about 20 μm. Further, in an additional embodiment, diamond particles 12 may exhibit a nominal size of less than about 1 μm (e.g., submicron-sized or nano-scale). Generally, agglomerated granule 10 may exhibit a selected size and a selected shape. In one example, agglomerated granule 10 may exhibit a generally spherical shape with a diameter D of about 183 μm. In one particular embodiment, agglomerated granules 10 may exhibit a diameter of between about 100 μm to about 200 μm. In other embodiments, agglomerated granule 10 may exhibit a diameter D of between about 10 μm and 30 μm. In another embodiment, agglomerated granule 10 may exhibit a diameter D of about 2 μm to about 10 μm. In yet an additional embodiment, agglomerated granule 10 may exhibit a diameter D of about 1 μm to about 5 μm. More generally and in other embodiments, an agglomerated granule may exhibit a generally ovoid or generally ellipsoid shape, without limitation. In yet additional embodiments, an agglomerated granule may be whisker-shaped, generally cylindrical, or generally elongated, without limitation.

Optionally, a solvent catalyst, other sintering aids, a plurality of different superabrasive particles, or combinations of the foregoing may be included in the agglomerated particle 10. Further, as discussed above, a binder may be employed for forming agglomerated granule 10 and may be at least partially removed from agglomerated granule 10, if desired. Thus, one of ordinary skill in the art will understand that an agglomerated granule (e.g., agglomerated granule 10 as shown in FIG. 1) may be formed with a selected superabrasive particle or a mixture of different superabrasive particles, without limitation.

An additional aspect of the present invention relates to increasing packing density of a plurality of agglomerated granules (e.g., during compaction, sintering, both, or neither) by forming a plurality of agglomerated granules of different sizes. Such a plurality of agglomerated granules of different sizes (or generally any mixture having differently sized particles) may be known as a multiple mode mixture. Generally, a multiple mode mixture exhibiting a wide particle size distribution may provide a higher packing density compared to a multiple mode mixture exhibiting a narrow particle size distribution. Thus, another aspect of the present invention relates to increasing the packing density of agglomerated granules by selecting the agglomerated granules to exhibit a relatively wide particle size distribution. For example, relatively high packing density can be achieved from a flat particle size distribution (i.e., having generally equal quantities of differently sized particles). In addition, a broad log-normal distribution may provide a relatively high packing density. In a further example, theoretically, a sufficiently wide particle size distribution may be selected and may produce a fractional packing density between about 0.82 to about 0.96. Generally, a packing density of a multiple mode mixture increases as the number of differently sized particles or granules increases, as long as the particles are sufficiently different in size and a selected (e.g., an optimized) percentage of each size is maintained.

For example, Table 1 shows theoretical packing fractions (or densities) for spherical particles having a relative size ratio of 7:1.

TABLE 1

| Number of different sizes | Weight percents of each size, respectively | Packing fraction |
| --- | --- | --- |
| 1 | 100 | 0.64 |
| 2 | 84, 16 | 0.86 |
| 3 | 75, 14, 11 | 0.95 |
| 4 | 72, 14, 11, 3 | 0.98 |

Thus, in one embodiment, a plurality of agglomerated granules comprising at least one superabrasive material may exhibit a mixed mode configuration as shown in Table 1. More generally, the present invention contemplates that a plurality of agglomerated granules may exhibit at least two different sizes having a relative size ratio of at least 7:1. Such configurations may provide, for instance, packing densities as shown in Table 1. Further, a superabrasive density or volume percentage subsequent to sintering may correlate to the packing density prior to sintering. Thus, an increased superabrasive green density may generate an increased sintered superabrasive density.

In another embodiment, the present invention also contemplates that an agglomerated granule may exhibit an ellipsoid or ovoid shape. For example, the present invention contemplates that agglomerated granules may be initially formed and subsequently subjected to a shaping processes, if necessary, to produce a selected exterior shape (e.g., generally spherical, generally ellipsoid or ovoid, whisker-shaped, generally cylindrical, etc.). In one embodiment, generally spherical agglomerated granules may be formed (e.g., by freeze drying or any other method). Increasing a non-sintered packing density by utilizing generally spherical particles of various sizes may, in turn, cause an increase in a sintered bond density of superabrasive granules/particles. Such a configuration may also minimize an amount of residual solvent catalyst remaining within the sintered superabrasive mass or volume after the sintering process. Optionally, generally spherical agglomerated granules may be subsequently shaped via contact with a set of rollers to form non-spherically shaped granules. Such a process may alter the shape of the agglomerated granules from generally spherical to generally ellipsoid, ovoid, or any other desired shape, without limitation. Ellipsoid or ovoid shaped granules may achieve a theoretical random packing density of about 74%.

As known in the art, prior to sintering, superabrasive particulate or powder may be optionally compacted or pressed to form a so-called "green compact" or "green part." Forming a green compact/part may be accomplished by exposing the substrate and superabrasive material to an elevated pressure (i.e, exceeding ambient atmospheric pressure). For example, a pressure of between about 20,000 psi to about 60,000 psi may be employed for forming a green compact/part. In one particular embodiment, a pressure of about 40,000 psi may be employed for forming a green compact/part. Typically, such compaction may occur at room temperature. However, optionally, compaction to form a green compact/part may occur at moderately elevated temperatures (e.g., about 100° Celsius to about 400° Celsius), if desired. Such compaction may increase a superabrasive volume fraction or density subsequent to HPHT sintering.

Figure 2:
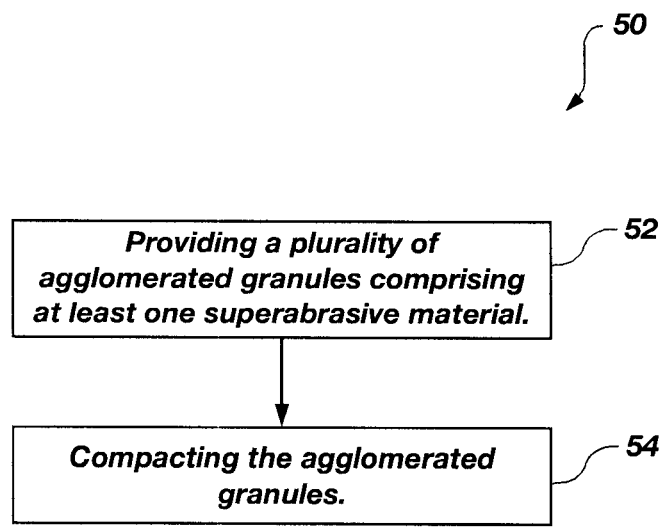
FIG. 2 shows a schematic diagram of one embodiment of a method for compacting agglomerated granules according to the present invention.
Figure 3:
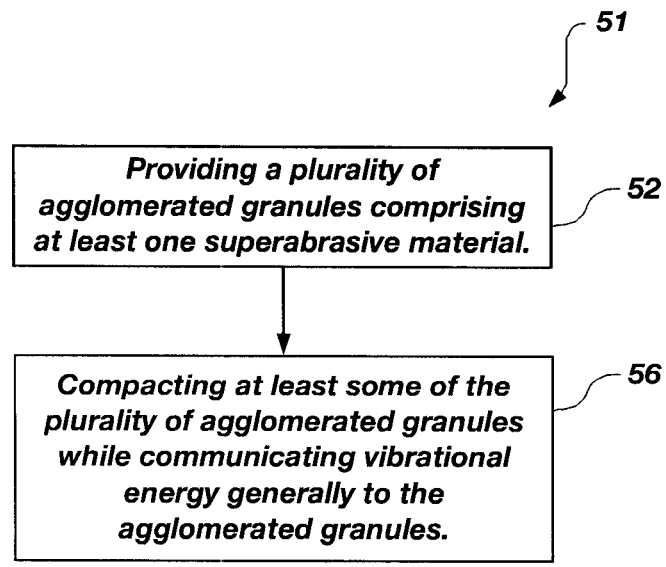
FIG. 3 shows a schematic diagram of another embodiment of a method for compacting agglomerated granules according to the present invention.

One aspect of the present invention contemplates that a plurality of agglomerated granules may be compressed to form a green compact. For example, FIG. 2 shows a schematic diagram depicting a compaction action 50. Particularly, as shown in FIG. 2, a plurality of agglomerated granules comprising at least one superabrasive material may be provided (in a providing action 52) and compacted (in a compaction action 54). In one embodiment, the plurality of agglomerated granules may comprise freeze-granulated agglomerated granules. Further, optionally, the present invention contemplates that high frequency vibration (e.g., ultrasonic vibration or other high frequency agitation as known in the art) may be employed in combination with elevated pressure when agglomerated granules comprising a superabrasive material are pressed or compacted into a green compact/part. For example, FIG. 3 shows a schematic diagram depicting a compaction action 51. As shown in FIG. 3, a plurality of agglomerated granules comprising at least one superabrasive material may be provided (in a providing action 52) and compacted (in a compaction action 56) while communicating vibrational energy generally to the agglomerated granules. Such a compaction process 51 may improve a packing density of the superabrasive material, which may, in turn, increase the superabrasive material volume fraction subsequent to sintering. Explaining further, the present invention contemplates that, in one embodiment, under elevated pressure and/or temperature employed for compaction (i.e., forming a green compact/part), binders used in a freeze-granulation process may become softened (e.g., heated to a temperature exceeding a glass transition temperature), may be at least partially melted, or may be a combination of the foregoing. Such softened and/or at least partially liquid binder may become a lubricant for the granules and/or particles comprising the granules. Reduced inter-particle/granule friction may increase a packing density of the agglomerated granules. Further, softened or at least partially liquid binder may couple (i.e., transfer) vibrational energy to the superabrasive material.

Figure 4:
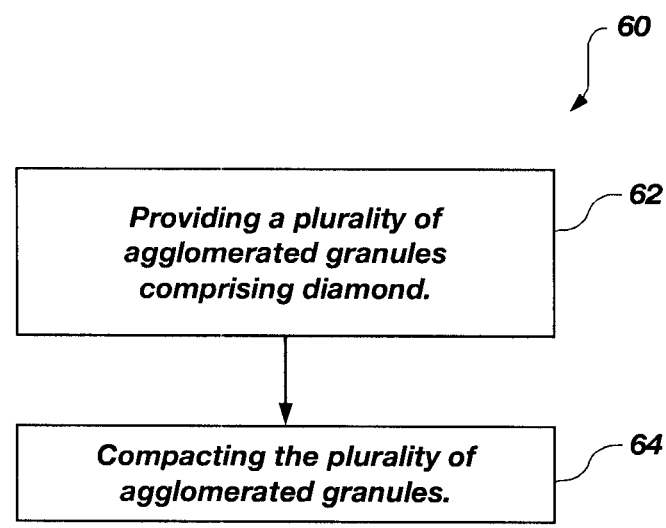
FIG. 4 shows a schematic diagram of one embodiment of a method for compacting agglomerated granules comprising diamond according to the present invention.
Figure 5:
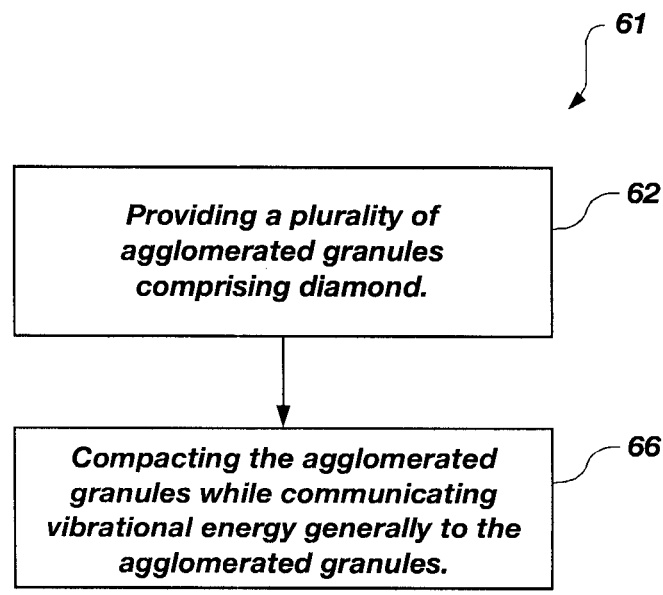
FIG. 5 shows a schematic diagram of another embodiment of a method for compacting agglomerated granules comprising diamond according to the present invention.

In one example, a diamond material may be compacted to form a green compact/part. For example, FIG. 4 shows a schematic diagram depicting a compaction action 60. More specifically, as shown in FIG. 4, a plurality of agglomerated granules comprising diamond may be provided (in a providing action 62) and compacted (in a compaction action 64). In one embodiment, the plurality of agglomerated granules may comprise a plurality of freeze-granulated agglomerated granules. Further, as described above, high frequency vibration (e.g., ultrasonic vibration or other high frequency agitation as known in the art) may be optionally employed in combination with elevated pressure when agglomerated granules comprising diamond are pressed or compacted into a green compact/part. For example, FIG. 5 shows a schematic diagram depicting a compaction action 61 comprising providing a plurality of agglomerated granules (in a providing action 62), wherein the agglomerated granules comprise diamond and compacting the plurality of agglomerated granules (in a compaction action 66) while communicating vibrational energy generally to the agglomerated granules. In one embodiment, the plurality of agglomerated granules may comprise freeze-granulated agglomerated granules.

Figure 6:
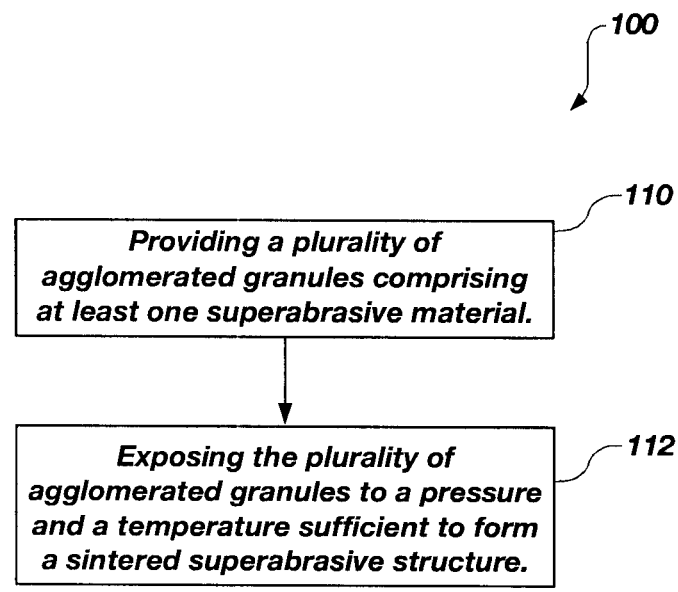
FIG. 6 shows a schematic diagram of one embodiment of a method for forming a sintered superabrasive structure according to the present invention.

In a further aspect of the present invention, a plurality of agglomerated granules comprising at least one superabrasive material may be exposed to a pressure and a temperature sufficient to form a sintered superabrasive structure. For example, FIG. 6 shows a schematic diagram of a method 100 for forming a sintered superabrasive structure. As shown in FIG. 6, a plurality of agglomerated granules comprising at least one superabrasive material may be provided (as depicted in providing action 110). Further, the plurality of agglomerated granules may be exposed to a pressure and a temperature sufficient to form a sintered superabrasive structure (as depicted in sintering action 112). In at least one embodiment, sintering action 112 may comprise a HPHT sintering process.

Figure 7:
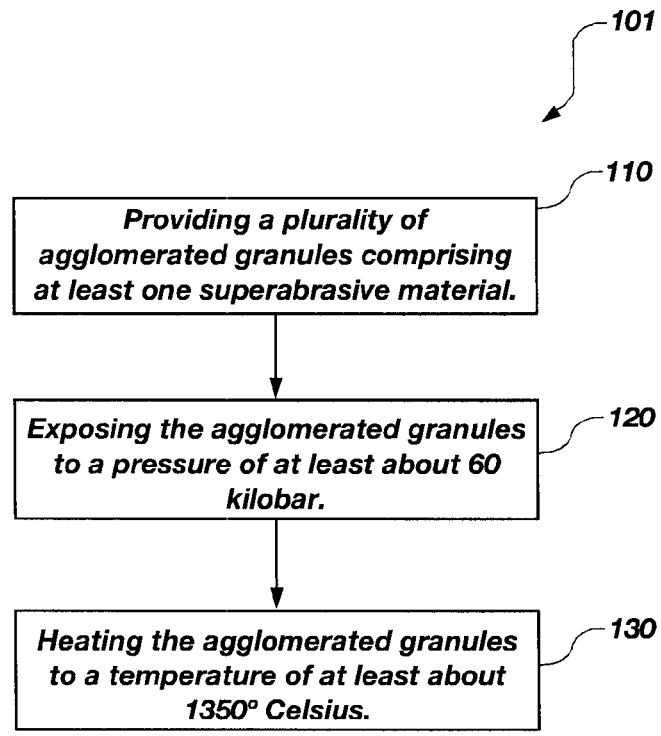
FIG. 7 shows a schematic diagram of another embodiment of a method for forming a sintered superabrasive structure according to the present invention.

For example, the present invention contemplates that a plurality of agglomerated granules comprising at least one superabrasive material (e.g., a plurality of agglomerated granules) may be exposed to a HPHT sintering process. Particularly, FIG. 7 shows a schematic diagram of a method 101 for forming a sintered superabrasive structure, wherein the method 101 generally includes process actions 110, 120, and 130. Particularly, a plurality of agglomerated granules comprising at least one superabrasive material (e.g., diamond, boron nitride, silicon carbide, etc.) may be provided in providing action 110. In one embodiment, the plurality of agglomerated granules may comprise freeze-granulated agglomerated granules. Further, the agglomerated granules may be exposed to a pressure of at least about 60 kilobar (e.g., between about 60 kilobar and 68 kilobar), as shown in action 120. Additionally, agglomerated granules may be heated to a temperature of at least about 1350° Celsius. Process actions 120 and 130 may be referred to collectively as a HPHT sintering process. In another embodiment, a HPHT sintering process may comprise exposing agglomerated granules to a pressure of at least about 52 kilobar and heating the agglomerated granules to a temperature of at least about 1320° Celsius. In a further embodiment of a HPHT sintering process, agglomerated granules may be exposed to a pressure of at least about 48 kilobar and the agglomerated granules may be heated to a temperature of at least about 1160° Celsius.

Figure 8:
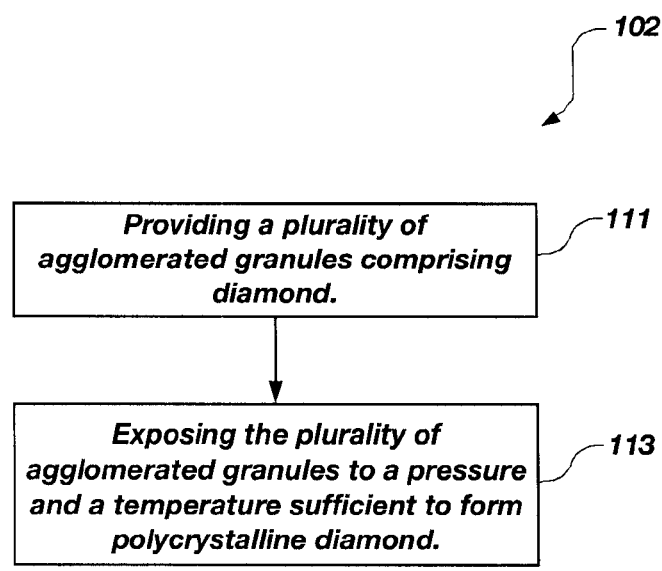
FIG. 8 shows a schematic diagram of one embodiment of a method for forming polycrystalline diamond according to the present invention.

Generally, in one aspect of the present invention, a plurality of agglomerated granules comprising diamond may be exposed to a pressure and a temperature sufficient to form polycrystalline diamond. For example, FIG. 8 shows a schematic diagram of a method 102 for forming polycrystalline diamond. As shown in FIG. 8, a plurality of agglomerated granules comprising diamond may be provided (as depicted in providing action 111). In one embodiment, the plurality of agglomerated granules may comprise freeze-granulated agglomerated granules. Further, the plurality of agglomerated granules may be exposed to a pressure and a temperature sufficient to form polycrystalline diamond (as depicted in sintering action 113). In at least one embodiment, sintering action 113 may comprise a HPHT sintering process, as described below.

Figure 9:
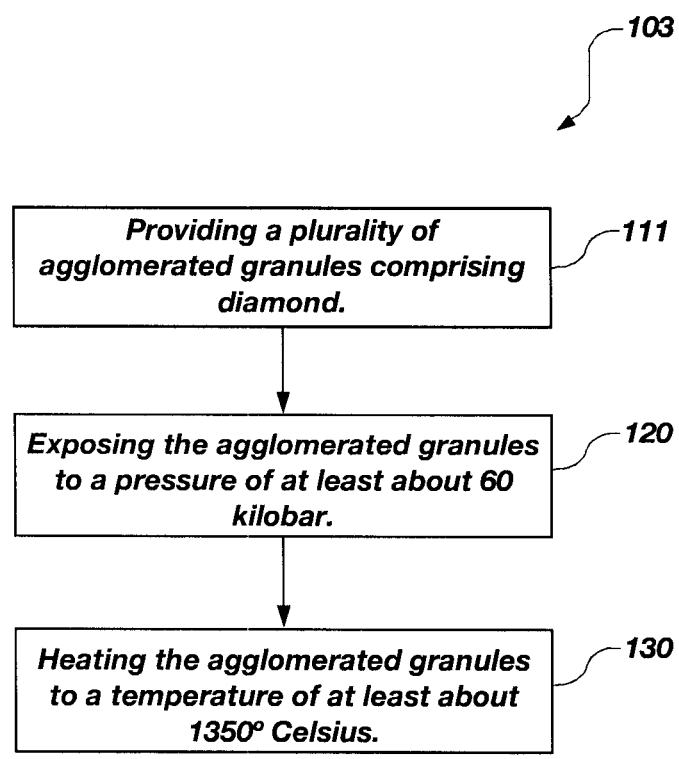
FIG. 9 shows a schematic diagram of another embodiment of a method for forming polycrystalline diamond according to the present invention.

For example, generally, the present invention contemplates that a plurality of agglomerated granules comprising diamond may be sintered to form polycrystalline diamond. For example, a plurality of agglomerated granules may be exposed to a sintering process (e.g., a HPHT sintering process such as, for example, a pressure of at least about 60 kilobar and a temperature of at least about 1350° Celsius) suitable for causing the individual diamond grains to bond to adjacent diamond grains to form polycrystalline diamond. Such a method 103 is schematically shown in FIG. 9 and includes actions labeled 111, 120, and 130. As described above, actions 120 and 130 may be referred to collectively as a HPHT sintering process. In another embodiment of a HPHT sintering process, the agglomerated granules may be exposed to a pressure of at least about 52 kilobar and the agglomerated granules may be heated to a temperature of at least about 1320° Celsius. In a further embodiment of a HPHT sintering process, agglomerated granules may be exposed to a pressure of at least about 48 kilobar and the agglomerated granules may be heated to a temperature of at least about 1160° Celsius. As known in the art, such a process may employ a catalyst such as cobalt. In another example a HPHT sintering process may utilize a non-cobalt catalyst, such as nickel, iron, or INVAR®. Any of the above-mentioned examples of pressures and temperatures for HPHT sintering processes may be employed within any of the herein discussed embodiments and aspects of the present invention, without limitation.

In addition, many variations in the composition of a superabrasive material comprising agglomerated granules are contemplated by the present invention. For example, a mixture of agglomerated granules and individual superabrasive particles may be provided. In one embodiment, the plurality of agglomerated granules may comprise freeze-granulated agglomerated granules. Further, the mixture may be exposed to a pressure of at least about 60 kilobar and may be heated to a temperature of at least about 1350° Celsius. Optionally, such a HPHT sintering process may include heating the mixture to a temperature exceeding 1400° Celsius. In one embodiment, the agglomerated granules and/or superabrasive particles may comprise diamond particles. In one embodiment, the agglomerated granules and/or superabrasive particles may exhibit a nominal size of between about 10 microns and 100 microns. In another embodiment, the agglomerated granules and/or superabrasive particles may comprise diamond particles exhibiting a nominal size of about 2 µm to about 20 µm. Further, in an additional embodiment, agglomerated granules and/or superabrasive particles may comprise diamond particles exhibiting a nominal size of less than 1 µm (i.e., submicron-sized or nano-scale particles/granules). Any combination of the foregoing size ranges or other particle/granule formulations are encompassed by the present invention, without limitation.

In one example of an article of manufacture comprising a superabrasive material, the present invention contemplates that any process encompassed by the above discussion may be employed for forming a superabrasive compact. For example, as discussed above, the present invention contemplates that polycrystalline diamond compacts may be manufactured by positioning agglomerated granules comprising diamond adjacent to a substrate (e.g., a cobalt-cemented tungsten carbide substrate, a substrate comprising tungsten carbide, or any other substrate) and subjecting the agglomerated granules and substrate to a HPHT sintering process. Thus, a polycrystalline diamond layer or table (i.e., a volume of polycrystalline diamond) may be formed upon the substrate. A polycrystalline diamond compact may be used as a cutting element, a bearing element, or may be utilized as known in the art or in any suitable manner, without limitation. More generally, the present invention contemplates that any superabrasive compact may be formed by employing agglomerated granules, without limitation.

Figure 10:
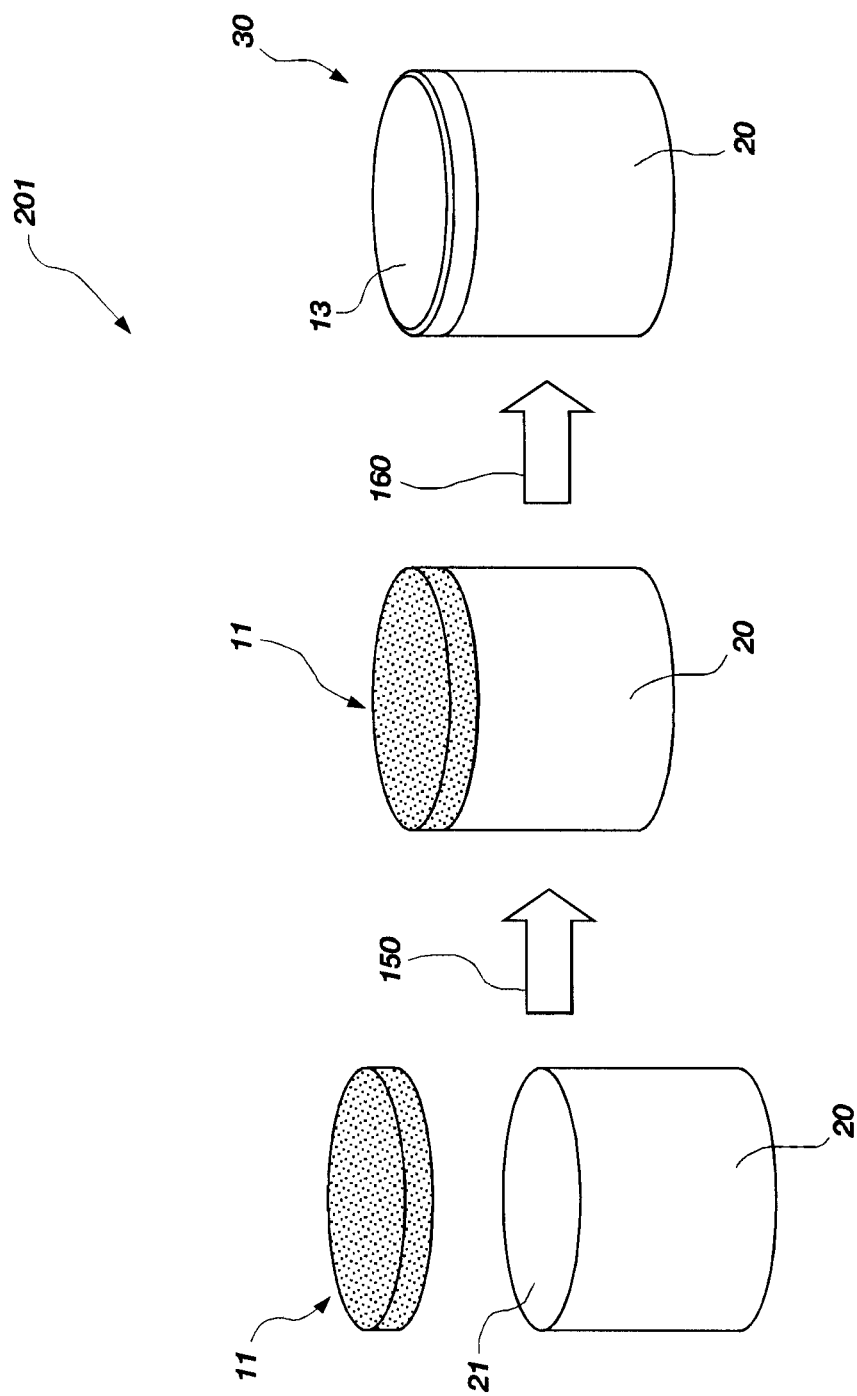
FIG. 10 shows a schematic diagram of one embodiment of a method for forming an article of manufacture according to the present invention.

Thus, the present invention contemplates that agglomerated granules may be provided comprising at least one superabrasive material to form a superabrasive compact. Particularly, initially, agglomerated granules may be positioned adjacent to a substrate, such as, for instance, a cemented tungsten carbide substrate (e.g., a cobalt-cemented tungsten carbide substrate) or any other substrate. For example, in other embodiments, a substrate may comprise at least one of the following: titanium carbide, niobium carbide, tantalum carbide, vanadium carbide, iron, and nickel, without limitation. Further, the agglomerated granules and the substrate may be sintered (e.g., HPHT sintered) while positioned adjacent to the substrate. Such a method 201 is schematically shown in FIG. 10. Particularly, material 11 and substrate 20 may be provided. According to the present invention, material 11 may comprise a plurality of agglomerated granules, wherein the agglomerated granules comprise at least one superabrasive material. As shown in FIG. 10, substrate 20 may be substantially cylindrical and may include an interfacial substrate surface 21. Optionally, substrate 20 may comprise cobalt-cemented tungsten carbide. Although FIG. 10 shows interfacial substrate surface 21 as being substantially planar, one of ordinary skill in the art will appreciate that interfacial substrate surface 21 may exhibit any selected nonplanar topography, as known in the art or otherwise developed, without limitation. In addition, assembly of the material 11 and substrate 20, which is represented by an arrow labeled 150 in FIG. 10, may position the material 11 adjacent to the substrate 20. Thus, material 11 may be positioned adjacent to interfacial substrate surface 21. Of course, other structural elements (e.g., metal cans, graphite structures, pyrophyllite or other pressure transmitting structures, other containers, or supporting elements) may be employed for positioning material 11 and substrate 20 or for successfully sintering material 11 to form a sintered superabrasive table (e.g, polycrystalline diamond). Further, material 11 and substrate 20 may be exposed to a sintering process, which is represented by an arrow labeled 160 in FIG. 10, to cause material 11 to form a superabrasive table 13, as shown in FIG. 10. Thus, a superabrasive compact 30 may be formed by such a process. In one embodiment, a polycrystalline diamond compact may be found by such a process. More specifically, in one embodiment, superabrasive table 13 may comprise a polycrystalline diamond table bonded to substrate 20, which may comprise a tungsten carbide substrate.

It should be understood that superabrasive material (e.g., polycrystalline diamond) is utilized in many applications. For instance, wire dies, bearings, artificial joints, inserts, cutting elements, and heat sinks may include superabrasive material. Thus, the present invention contemplates that any of the methods encompassed by the above-discussion related to forming superabrasive material may be employed for forming an article of manufacture comprising at least one superabrasive material.

Figure 11:
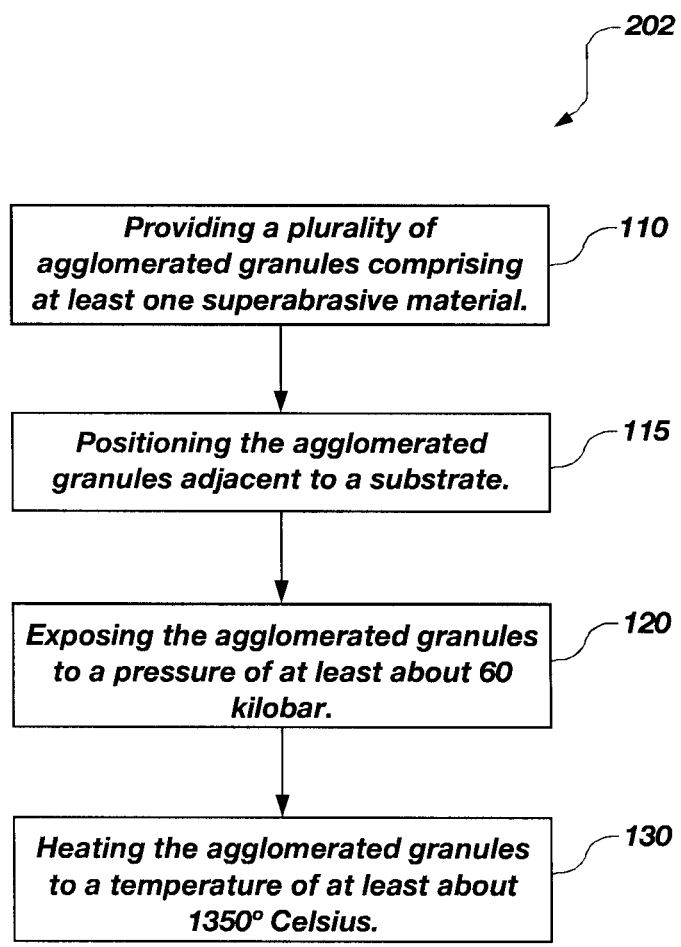
FIG. 11 shows a schematic diagram of one embodiment of a method for forming a superabrasive compact.

Generally, one aspect of the present invention relates to a volume of at least one superabrasive material formed (i.e., sintered) upon a substrate. FIG. 11 shows a schematic representation of a method 202 for manufacturing an article of manufacture comprising at least one superabrasive material. Typically, agglomerated granules comprising at least one superabrasive material may be provided (as depicted in providing action 110) and positioned (as depicted in positioning action labeled 115) adjacent to a substrate (e.g., a substrate comprising cobalt-cemented tungsten carbide). Further, the agglomerated granules and the substrate may be subjected to a HPHT sintering process (actions labeled 120 and 130). Such a sintering process may produce a volume of superabrasive material formed upon (e.g., bonded to) the substrate. Any substrate (e.g., as known in the art or otherwise developed) may be utilized, such as a substrate comprising at least one of the following: tungsten carbide, titanium carbide, niobium carbide, tantalum carbide, vanadium carbide, iron, and nickel, without limitation.

Figure 12:
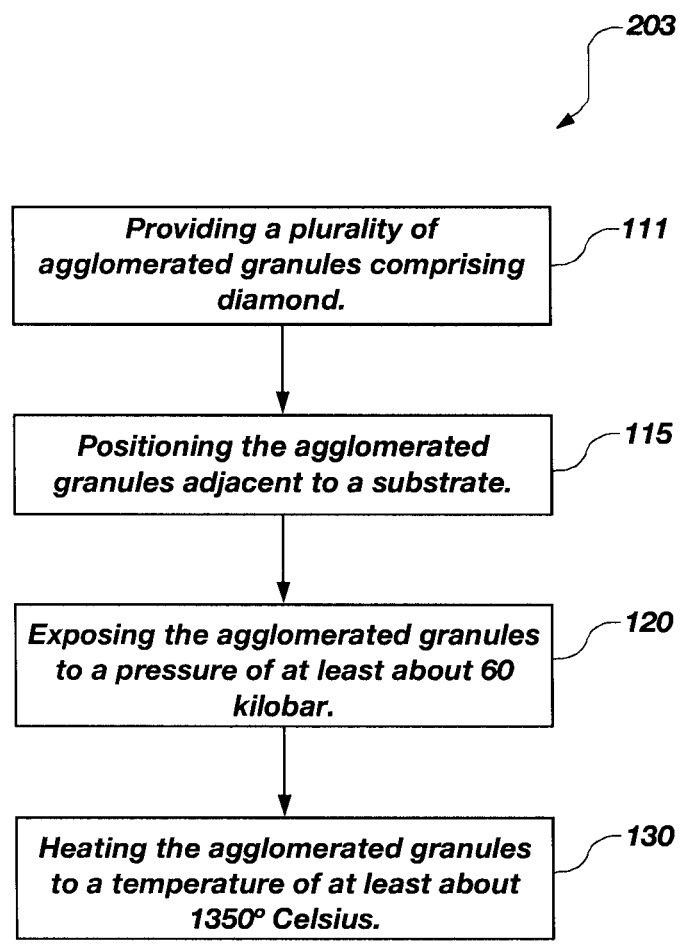
FIG. 12 shows a schematic diagram of one embodiment of a method for forming a polycrystalline diamond compact.

In another embodiment, the present invention contemplates that a volume of polycrystalline diamond may be formed upon a substrate. FIG. 12 shows a schematic representation of a method 203 for manufacturing an article of manufacture comprising polycrystalline diamond. Typically, agglomerated granules comprising diamond may be provided (as depicted in providing action 111), positioned (as depicted in providing action labeled 115) adjacent to a substrate (e.g., a substrate comprising cobalt-cemented tungsten carbide), and subjected to a HPHT sintering process (actions labeled 120 and 130). Such a sintering process may produce a volume of polycrystalline diamond formed upon (e.g., bonded to) the substrate. Any substrate (e.g., as known in the art or otherwise developed) may be utilized, such as a substrate comprising at least one of the following: tungsten carbide, titanium carbide, niobium carbide, tantalum carbide, vanadium carbide, iron, and nickel, without limitation.

Thus, the present invention contemplates that any apparatus as known in the art comprising at least one superabrasive material may include a sintered structure formed with agglomerated granules as described herein. In one example, a rotor and a stator (i.e., a thrust bearing apparatus) may each comprise polycrystalline diamond and may be operably assembled to downhole drilling assembly, as known in the art. U.S. Pat. Nos. 4,410,054, 4,560,014, 5,364,192, 5,368,398, and 5,480,233, the disclosure of each of which is incorporated herein, in its entirety, by this reference, disclose exemplary subterranean drilling systems within which bearing apparatuses according to the present invention may be incorporated. Of course, in other examples, polycrystalline diamond manufactured with agglomerated granules may comprise heat sinks, wire dies, bearing elements, cutting elements, cutting inserts (e.g., on a fixed cutter or roller cone type drill bit), machining inserts, or any other article of manufacture as known in the art. Other examples of articles of manufacture comprising polycrystalline diamond may be disclosed by, inter alia, U.S. Pat. Nos. 4,811,801, 4,274,900, 4,268,276, 4,468,138, 4,738,322, 4,913,247, 5,016,718, 5,092,687, 5,120,327, 5,135,061, 5,154,245, 5,460,233, 5,544,713, and 6,793,681, the disclosure of each of which is incorporated herein, in its entirety, by this reference.

As mentioned above, during sintering of agglomerated granules, a catalyst material (e.g., cobalt, nickel, etc.) may be employed for facilitating formation of a sintered superabrasive structure (e.g., polycrystalline diamond). In one example, agglomerated granules comprising diamond powder or diamond material may be placed adjacent to a cobalt-cemented tungsten carbide substrate and subjected to a HPHT sintering process. During such a HPHT sintering process, molten cobalt may wick or sweep into the diamond. Such cobalt may remain in the polycrystalline diamond table upon sintering and cooling. In other embodiments, catalyst may be provided within a superabrasive material comprising agglomerated granules, as a layer of material between the substrate and diamond, or as otherwise known/developed in the art. Subsequent to sintering, such a catalyst material may be at least partially removed (e.g., by acid-leaching or as otherwise known in the art) from at least a portion of the volume of polycrystalline diamond (e.g., a table) formed upon the substrate. Catalyst removal may be substantially complete to a selected depth from an exterior surface of the polycrystalline diamond table, if desired, without limitation. As known in the art, at least partial catalyst removal may provide a polycrystalline diamond material with increased thermal stability, which may also beneficially affect the wear resistance of the polycrystalline diamond material.

Figure 13:
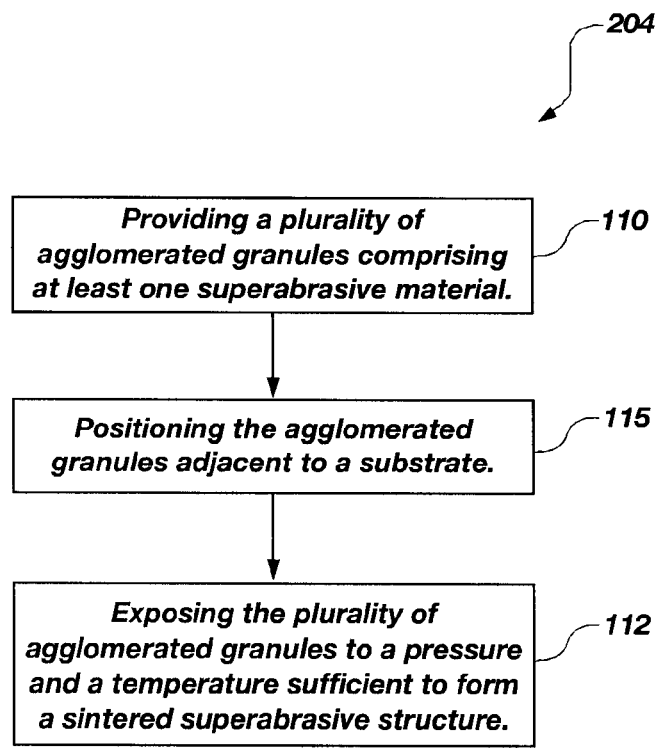
FIG. 13 shows a schematic diagram of another embodiment of a method for forming a superabrasive compact.

In a further aspect of the present invention, a plurality of agglomerated granules comprising at least one superabrasive material may be positioned adjacent to a substrate and may be exposed to a pressure and a temperature sufficient to form a sintered superabrasive structure. For example, FIG. 13 shows a schematic representation of a method 204 for forming a sintered superabrasive structure. Particularly, agglomerated granules comprising at least one superabrasive material may be provided (as depicted in providing action 110) and positioned (as depicted in positioning action labeled 115) adjacent to a substrate (e.g., a substrate comprising cobalt-cemented tungsten carbide). Further, the plurality of agglomerated granules may be exposed to a pressure and a temperature sufficient to form a sintered superabrasive structure (as depicted in sintering action 112). In at least one embodiment, sintering action 112 may comprise a HPHT sintering process.

Figure 14:
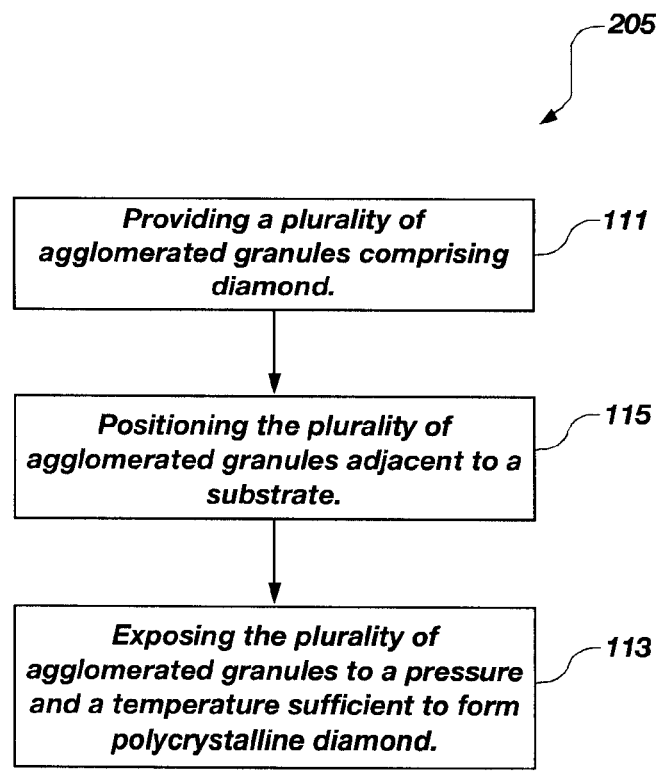
FIG. 14 shows a schematic diagram of another embodiment of a method for forming a polycrystalline diamond compact.

For example, a plurality of agglomerated granules comprising diamond may be positioned adjacent to a substrate and exposed to a pressure and a temperature sufficient to form polycrystalline diamond. For example, FIG. 14 shows a schematic representation of a method 205 for forming polycrystalline diamond. Particularly, agglomerated granules comprising diamond may be provided (as depicted in providing action 111) and positioned (as depicted in positioning action labeled 115) adjacent to a substrate (e.g., a substrate comprising cobalt-cemented tungsten carbide). Further, the plurality of agglomerated granules may be exposed to a pressure and a temperature sufficient to form polycrystalline diamond (as depicted in sintering action 113). In at least one embodiment, sintering action 113 may comprise a HPHT sintering process.

The present invention further contemplates that a sintered superabrasive structure formed by the methods described above may exhibit at least one structural difference in comparison to conventionally manufactured superabrasive material. For example, one of ordinary skill in the art may appreciate that, subsequent to HPHT sintering, at least one detectable characteristic related to the agglomerated granules may remain within the superabrasive material (e.g., polycrystalline diamond). Thus, the nature of the at least one characteristic within the superabrasive material may be structurally distinguishable and detectable in comparison to such superabrasive material when conventionally formed. Further, the inventors of the present invention contemplate that nano-scale or submicron-sized powders may be more easily handled, processed, and/or utilized for producing superhard material (e.g., utilizing agglomerated granules to form polycrystalline diamond cutting elements or compacts). Such a configuration may provide an advantageous approach for utilizing nano-scale particles in the manufacture of a superhard material.

Figure 15:
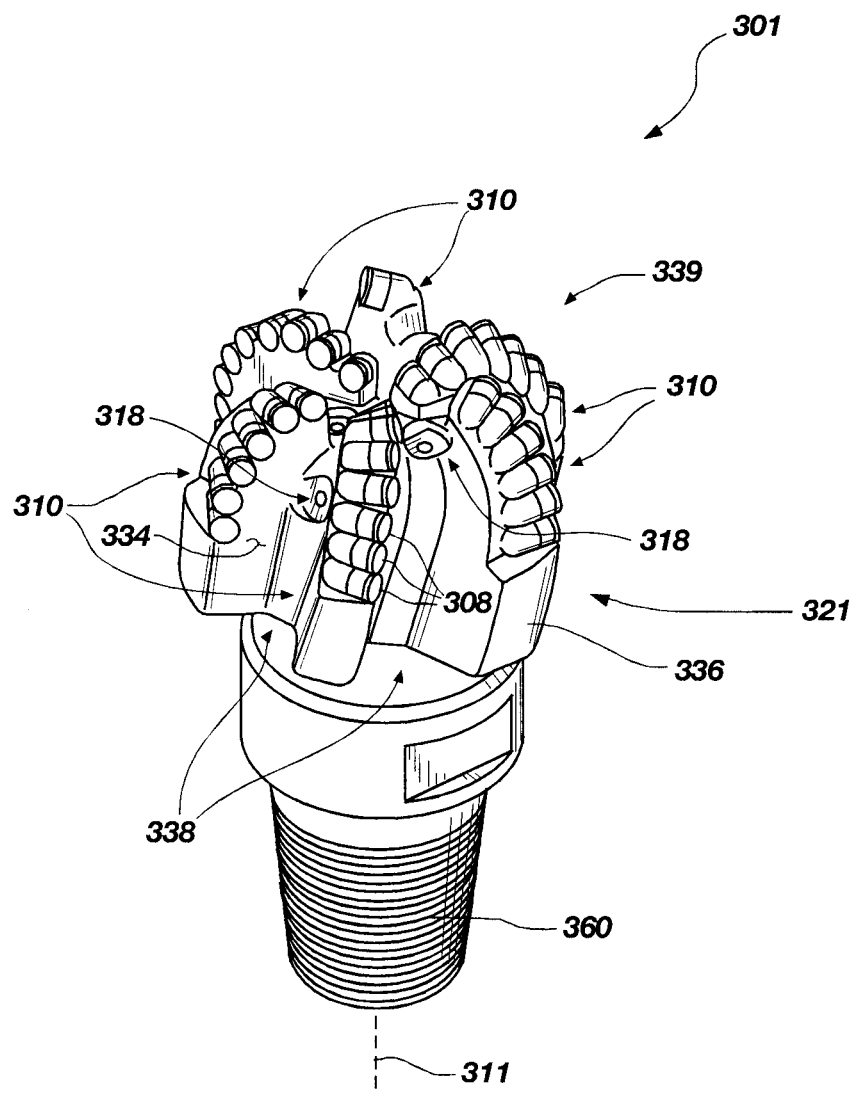
FIG. 15 shows a perspective view of a rotary drill bit including at least one cutting element according to the present invention.
Figure 16:
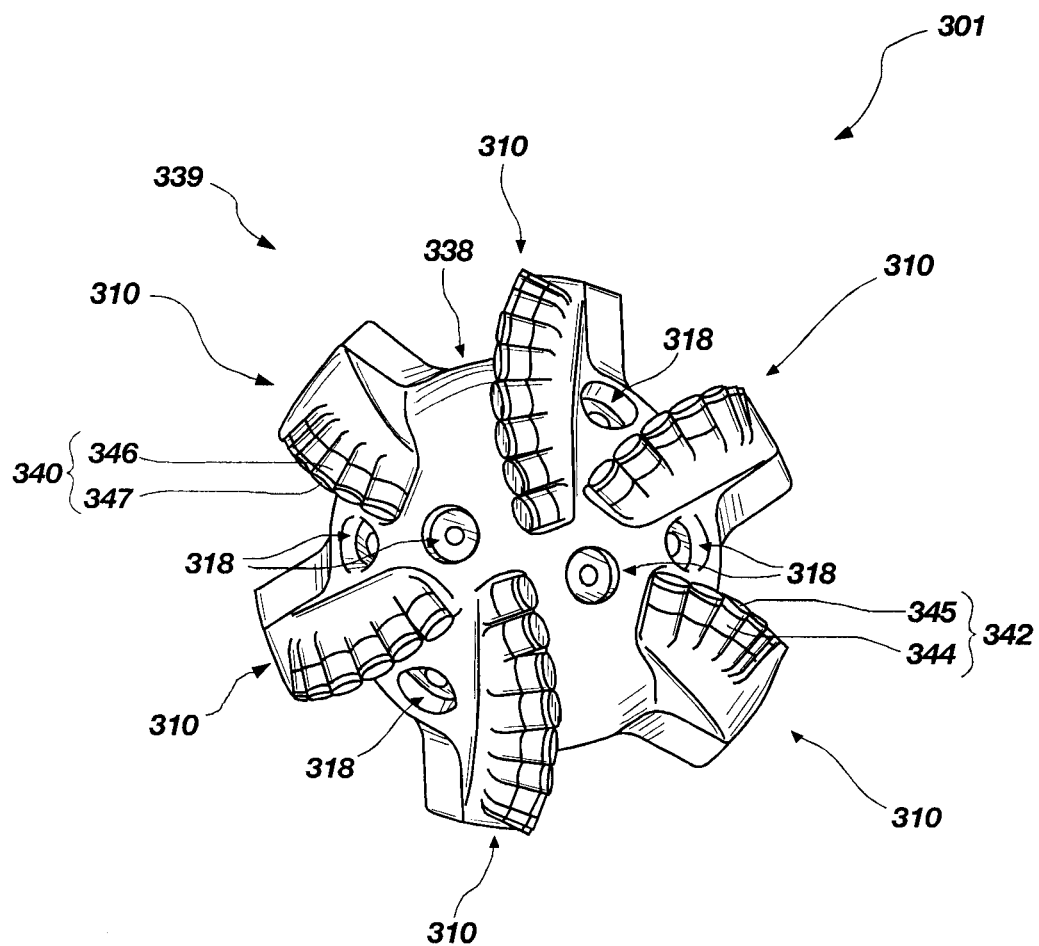
FIG. 16 shows a top elevation view of the rotary drill bit shown in FIG. 15.

As may be appreciated from the foregoing discussion, the present invention further contemplates that at least one superabrasive cutting element manufactured according to the above-described processes may be coupled to a rotary drill bit. For example, FIGS. 15 and 16 show a perspective view and a top elevation view, respectively, of an example of an exemplary rotary drill bit 301 of the present invention including superabrasive cutting elements 308 (e.g., cutting element 340 and/or cutting element 342) secured the bit body 321 of rotary drill bit 301. One or more of superabrasive cutting elements 308 may be manufactured according to the above-described processes of the present invention. In one embodiment, one or both of superabrasive cutting elements 340 and 342 may be manufactured according to the above-described processes of the present invention. Further, as shown in FIG. 16, superabrasive cutting element 340 may comprise a superabrasive table 347 formed upon a substrate 346. Similarly, superabrasive cutting element 342 may comprise a superabrasive (e.g., polycrystalline diamond) table 345 formed upon a substrate 344 (e.g., a cobalt-cemented tungsten carbide substrate). Generally, rotary drill bit 301 includes a bit body 321 which defines a leading end structure for drilling into a subterranean formation by rotation about longitudinal axis 311 and application of weight-on-bit, as known in the art. More particularly, rotary drill bit 301 may include radially and longitudinally extending blades 310 including leading faces 334. Further, circumferentially adjacent blades 310 define so-called junk slots 338 therebetween, as known in the art. As shown in FIGS. 15 and 16, rotary drill bit 301 may also include, optionally, superabrasive cutting elements 308 (e.g., generally cylindrical superabrasive cutting elements such as PDC cutters) which may be conventional, if desired. Additionally, rotary drill bit 301 includes nozzle cavities 318 for communicating drilling fluid from the interior of the rotary drill bit 301 to the superabrasive cutting elements 308, face 339, and threaded pin connection 360 for connecting the rotary drill bit 301 to a drilling string, as known in the art.

It should be understood that although rotary drill bit 301, as illustrated in FIGS. 15 and 16, includes superabrasive cutting elements 340 and 342, the present invention is not limited by this embodiment. Rather, a rotary drill bit according to the present invention may include, without limitation, one or more superabrasive cutting elements according to the present invention. Optionally, all of the superabrasive cutting elements (i.e., cutting element 340, cutting element 342, and cutting element 308) shown in FIGS. 15 and 16 may be formed according to a process contemplated by the present invention. Also, one of ordinary skill in the art will understand that FIGS. 15 and 16 merely depict one example of a rotary drill bit employing at least one superabrasive cutting element (i.e., at least one of cutting element 340, cutting element 342, and/or cutting elements 308) of the present invention, without limitation. More generally, the present invention contemplates that drill bit 301 may represent any number of earth-boring tools or drilling tools, including, for example, core bits, roller-cone bits, fixed-cutter bits, eccentric bits, bicenter bits, reamers, reamer wings, or any other downhole tool including polycrystalline diamond or other superabrasive cutting elements or inserts, without limitation.

While certain embodiments and details have been included herein and in the attached invention disclosure for purposes of illustrating the invention, it will be apparent to those skilled in the art that various changes in the methods and apparatus disclosed herein may be made without departing form the scope of the invention, which is defined in the appended claims. The words "including" and "having," as used herein, including the claims, shall have the same meaning as the word "comprising."

What is claimed is:

1. A rotary drill bit for drilling a subterranean formation, comprising:
    a bit body comprising a leading end having generally radially extending blades structured to facilitate drilling of a subterranean formation;
    at least one cutting element affixed to the bit body, the at least one cutting element comprising:
    a substrate;
    a coherent matrix of polycrystalline diamond defining a superhard table bonded to the substrate;
    wherein the coherent matrix of polycrystalline diamond includes a plurality of agglomerated granules extending from the substrate to an exposed surface of the superhard table distal of the substrate, at least a majority of the plurality of agglomerated granules being sintered directly to adjacent agglomerated granules to exhibit diamond-to-diamond bonds therebetween, the granules comprising at least two different size diamond particles and binder, wherein the diamond particles have a size of less than about 100 µm.

2. The rotary drill bit of claim 1, wherein the diamond particles have a size between about 2 µm and about 20 µm.

3. The rotary drill bit of claim 1, wherein the diamond particles have a size between about 2 µm and about 10 µm.

4. The rotary drill bit of claim 1, wherein the diamond particles have a size between about 10 µm and about 100 µm.

5. The rotary drill bit of claim 1, wherein the substrate comprises at least one of the following: cobalt-cemented tungsten carbide, titanium carbide, niobium carbide, tantalum carbide, vanadium carbide, iron, and nickel.

6. The rotary drill bit of claim 1, wherein the plurality of agglomerated granules comprise a plurality of agglomerated granules exhibiting at least one of the following shapes: generally spherical, generally ellipsoid, and generally cylindrical.

7. The rotary drill bit of claim 1, wherein the plurality of agglomerated granules comprise a plurality of agglomerated granules exhibiting different sizes.

8. The rotary drill bit of claim 6, wherein the plurality of agglomerated granules comprise a plurality of agglomerated granules exhibiting at least two different sizes having a relative size ratio of at least 7:1, wherein the plurality of particles of at least one of the plurality of agglomerated granules includes diamond particles having at least two different sizes.

9. The rotary drill bit of claim 1, wherein the plurality of agglomerated granules comprise a plurality of agglomerated granules exhibiting a packing density, prior to sintering, of at least about 64%.

10. The rotary drill bit of claim 1, wherein the cutting element is substantially cylindrical.

\* \* \* \* \*